June 16, 1936.  E. SCHULTHESS  2,044,335
COUPLING DEVICE
Filed Feb. 6, 1934  2 Sheets-Sheet 1
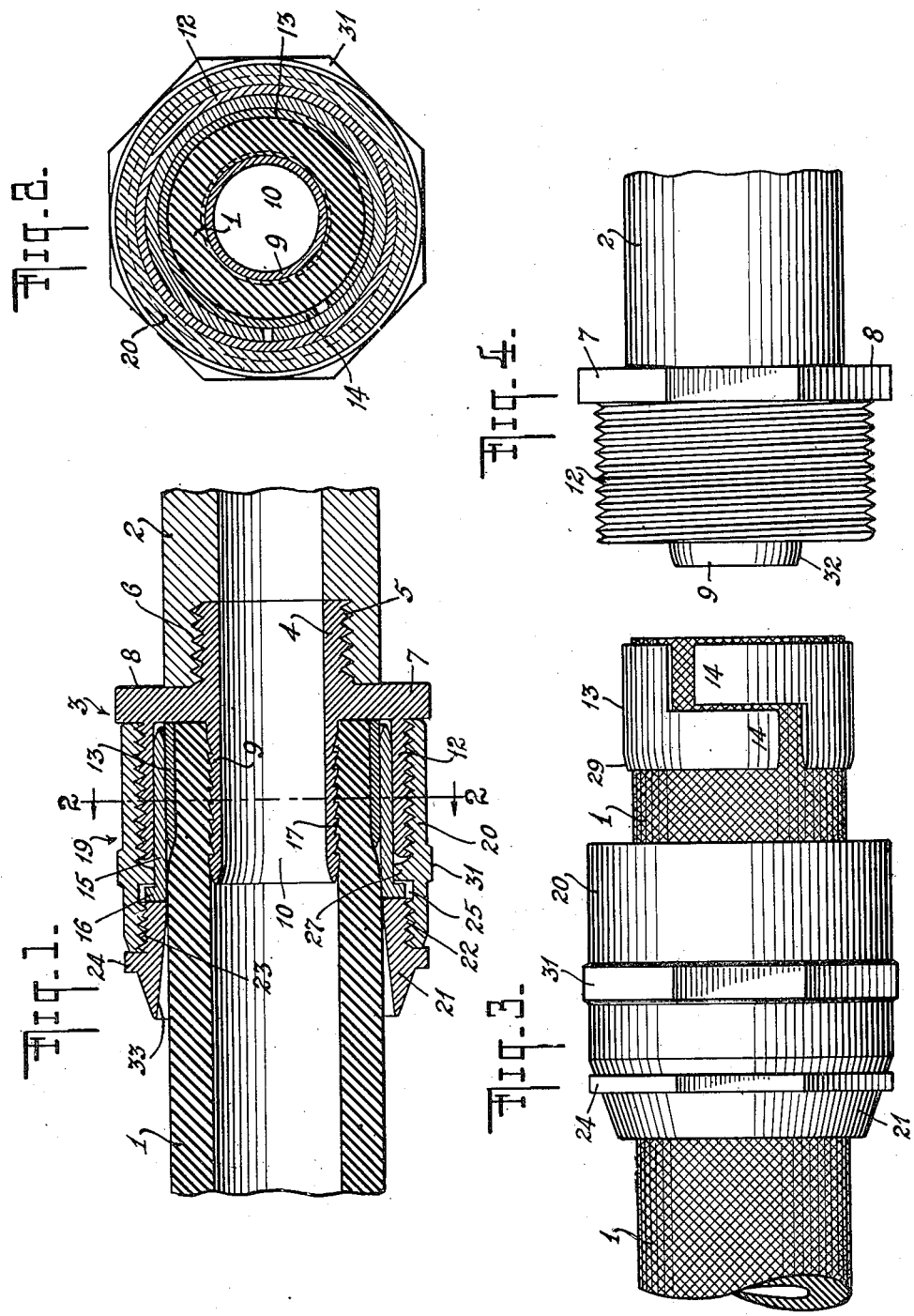
WITNESS
G. V. Rasmussen
INVENTOR
ERNEST SCHULTHESS
BY
ATTORNEYS June 16, 1936.　　　　E. SCHULTHESS　　　　2,044,335
COUPLING DEVICE
Filed Feb. 6, 1934　　　2 Sheets-Sheet 2
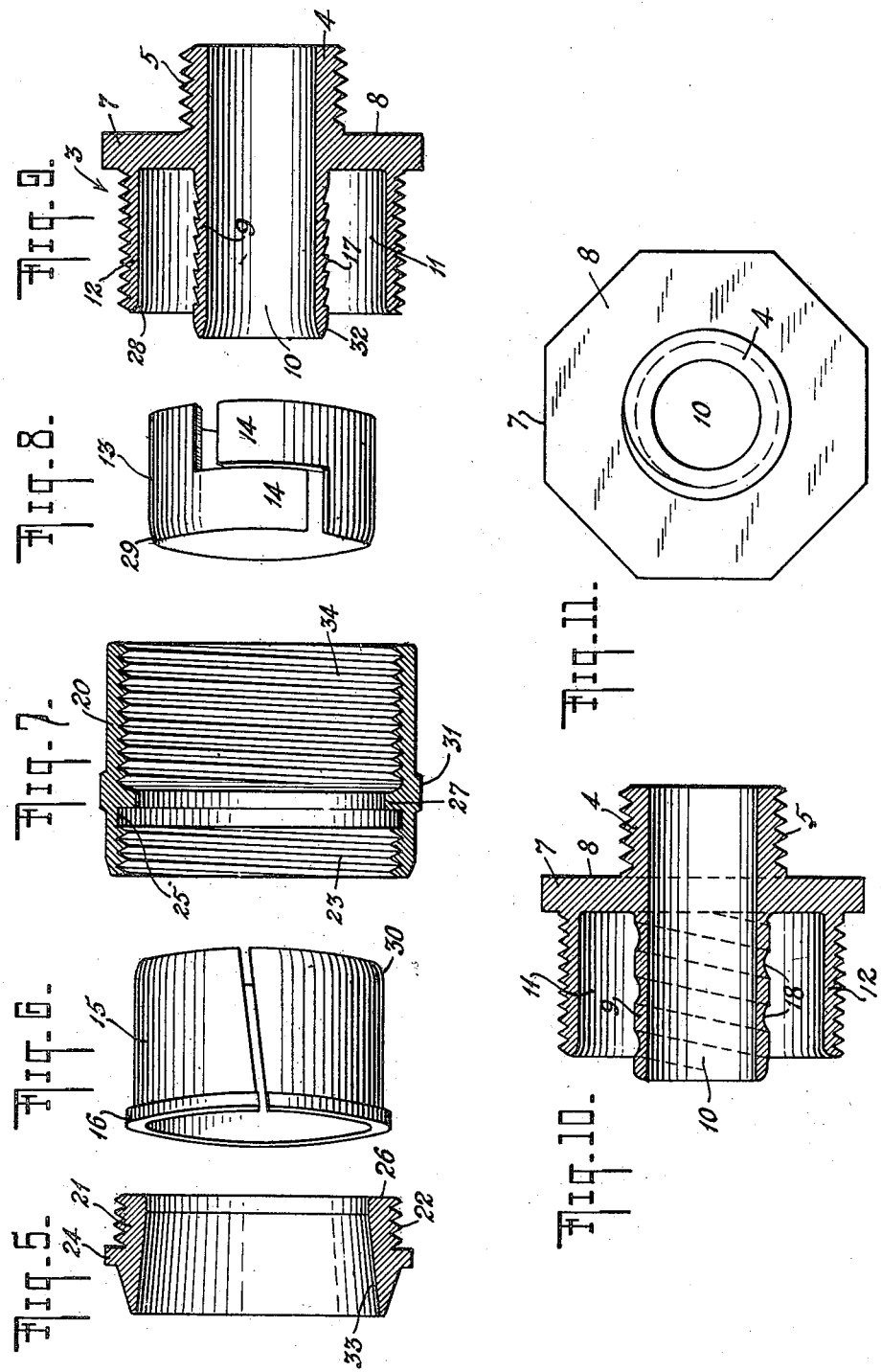
WITNESS
G. V. Rasmussen
INVENTOR
ERNEST SCHULTHESS
BY
ATTORNEYS Patented June 16, 1936

2,044,335

UNITED STATES PATENT OFFICE 2,044,335

COUPLING DEVICE

Ernest Schulthess, South Orange, N. J.

Application February 6, 1934, Serial No. 709,908

5 Claims. (Cl. 285—86)

This invention relates to coupling devices and more particularly to coupling devices for use in making hose and/or pipe connections.

The object of the invention is to provide an efficient, simply constructed and durable coupling device that can be quickly and easily connected to or disengaged from a hose or pipe without the use of special tools or equipment. Another object of the invention is to provide a coupling that will form a safe, positive, leak-proof connection between a flexible hose and a pipe or stationary outlet and which will not loosen its grip on or rupture the hose while in use.

Other objects and advantages as well as the novel details of construction of this invention will become apparent after a consideration of the description hereinbelow set forth taken in connection with the accompanying drawings and after a perusal of the appended claims.

A particular embodiment of my improved coupling is illustrated in the accompanying drawings in which similar reference characters identify similar parts in the several views and in which Fig. 1 shows a central vertical cross-section of a coupling constructed according to the invention connecting one end of a hose to a pipe or outlet; Fig. 2 is a cross-section taken along the line 2—2 of Fig. 1; Figs. 3 and 4 illustrate the several parts of the coupling in position for connecting the hose to the pipe or outlet; Figs. 5 to 9 inclusive, constitute an unassembled view of the various parts of the coupling shown in Fig. 1, in which Fig. 5 is a central vertical cross-section of the tail part or outer end portion of the female member of the coupling; Fig. 6 is a perspective view of the wedging sleeve or ring which is supported in the female member; Fig. 7 is a vertical cross-section of the main body portion of the female member of the coupling; Fig. 8 is a perspective view of the sleeve or ring which is mounted on the end of the hose; Fig. 9 is a vertical cross-section of the male member of the coupling; Fig. 10 illustrates a modified construction of the male member of the coupling; and Fig. 11 is a right end view of the male member of the coupling.

Referring more particularly to Fig. 1 of the drawings in which a coupling constructed according to the invention is shown connecting a flexible hose 1 to a pipe or outlet 2, the reference character 3 generally designates the male member of such coupling which is preferably made of an integral piece of brass but may also be made of any other suitable materials. The male member 3 comprises a cylindrical end portion 4 which may be provided with a male or female thread depending upon whether the pipe or outlet to which it is to be connected is internally or externally threaded. In the embodiment shown, the end portion 4 is provided with a screw thread 5 on the outer periphery thereof which is adapted to screw into the screw thread 6 provided on the inner periphery of the outlet 2. Integrally associated with the inner end of the threaded portion 4 is an outwardly extending annular shoulder 7 having an octangularly shaped outer edge, as is clearly shown in Fig. 11, so that the male member 3 may be screwed in place in the end of the outlet 2 by means of a wrench. The thread 5 on the end portion 4 preferably extends up to the base of the shoulder 7 so that when the male member 3 is screwed in position on the outlet 2, the face 8 of the shoulder 7 tightly abuts against the outer end of the outlet, as shown in Fig. 1. A cylindrical portion or shank 9 is integrally associated with the shoulder 7 and the inner end of the threaded portion 4 and together with the latter forms a passageway 10 extending longitudinally through the center of the male member 3 and through which flows the fluid in its passage from the outlet 2 to the hose 1. As shown in Fig. 1, the diameter of the passageway is the same throughout its length and preferably is approximately the same as the inside diameter of the outlet 2 so that the flow of fluid through the male member 3 is unobstructed.

An annular recess 11 circumscribing the shank 9 is formed between the latter and an annular externally threaded wall 12 integrally attached at its inner end to the outer end portion of the shoulder 7, such wall being disposed in parallel relation with the cylindrical wall of the shank 9 so as to be concentric therewith. The distance between the outer periphery of the shank 9 and the inner periphery of the annular wall 12 is slightly greater than the combined thickness of the wall of the hose 1 and the expansible and contractible sleeve or ring 13 when the latter is mounted in position on the end of the hose 1 as shown in Figs. 1 and 3, so that the end portion of the hose together with the ring 13 may be readily inserted in position in the annular recess 11. The annular wall 12 is shorter in length than the shank 9, as is clearly shown in Fig. 9, for a purpose which will be hereinafter explained.

The ring 13 which is split in order that its diameter may be varied is made of steel or any other suitable material and is preferably shorter in width than the depth of the recess 11 so that when the parts of the coupling are assembled it is contained entirely within the recess, as shown in Fig. 1. The compression ring 13 is preferably split in such manner that it will completely encircle the outer periphery of the hose when in position thereon yet may be compressed or reduced in diameter on the hose without any of its parts overlapping. In the embodiment illustrated in the drawings and particularly in Fig. 8, the ring 13 consists of an annular sleeve-like member made of steel which has been cut or split so that two arcuately curved tongues or extensions 14, each being substantially one-half the width of the ring, are formed adjacently each other. As shown in the drawings, the outer ends of the adjacently aligned extensions 14 are normally spaced from the body portion of the ring. With this construction, the diameter of the ring may be varied from its normal size to accommodate various sized hose while yet completely encircling the outer periphery of the hose on which it is mounted and while in position thereon may be appreciably decreased in diameter without the ends 14 thereof coming into overlapping relation on the body of the ring. While I have shown and described an annular split ring having adjacently aligned arcuately shaped extensions to accomplish this result it is obvious that other constructions, such as a spirally cut ring, may also be used to equal advantage. The size and thickness of the ring 13 that is to be mounted on the end of the hose is determined by the size of the hose and the thickness of the material constituting the wall of the hose.

A second expansible and contractible ring 15 in the assembled condition of the parts encircles the ring 13 and is positioned in between the latter and the outer annular wall 12 of the recess 11, in wedged relation, as shown in Fig. 1. The ring 15 which is made of the same material as the ring 13 is appreciably greater in width than the wall 12 so that in the assembled condition of the coupling it extends beyond the edge of such wall. The outer end of the ring 15 is provided with an outwardly extending shoulder or flange 16 which seats in a recess provided in the female member as will be later explained and the ring is split or slotted diagonally across its entire width and through the shoulder 16 so that the ring may be contracted or expanded. The recess 11 and the rings 13 and 15 are so dimensioned with respect to the hose that is being connected to the pipe or outlet 2 that the end portion of the hose and the rings 13 and 15 are tightly wedged together in the recess, the ring 15 encircling and tightly compressing the ring 13 around the outer periphery of the hose and into anchored relation therewith and jamming the inner periphery of the hose tightly against the outer periphery of the shank 9. The outer peripheral surface of the shank 9 may be smooth or provided with indentations in the nature of corrugations or serrations 17, as shown in Fig. 9, so that a portion of the material of which the hose is constituted is pressed into and anchored in such serrations thereby preventing any possibility of the hose slipping out from the recess 11 while in use. In a modified form, the indented portion of the shank 9 may be in the form of a depressed spiral groove 18, as shown in Fig. 10, which in addition to serving as a means for anchoring the hose in the coupling, also enables the hose to be easily removed from the male member 3 when the hose is to be uncoupled, by unscrewing the male member therefrom. The form and depth of the indentations in the outer peripheral surface of the shank 9 are governed by the diameter of the hose, the thickness of its walls and the type of material of which the walls are made so that a positive and secure anchorage will be provided for the hose whether it be made of rubber or cotton with rubber lining or metal lined with rubber and fabric and/or rubber covered. The shank 9 is preferably made of sufficient length to extend appreciably beyond the outer end of the ring 13 when the parts are assembled in position in the recess 11, as shown in Fig. 1, to afford a better grip on the hose and at the same time to maintain at a minimum the stresses produced on that portion of the hose wall adjacent to the outer end of the ring 13, by causing any flexing or bending strains on the hose wall to be absorbed by that portion of the hose wall adjacent the outer end of the shank 9, thus materially lessening the possibility of rupture of the hose wall adjacent the outer end of the ring 13 and prolonging the life of the hose.

Threadedly engaging the outer wall 12 of the recess 11 is an internally threaded female member 19 made of brass or any other suitable metal and comprising an annular body portion or union 20 and a tail or end portion 21. The inner end portion of the tail part 21 is provided with a male thread 22 which screws into the female thread 23 provided on the outer end portion of the union member 20. An octangularly shaped shoulder 24 is provided on the tail part 21 so that the latter may be screwed tightly in place on the union member 20 by means of a wrench. When the union member 20 and the tail part 21 are in assembled condition, as shown in Fig. 1, an annular recess or groove 25 is formed on the inner periphery of the female member 19 between the inner end 26 of the tail part 21 and an inwardly extending annular shoulder 27 provided on the union member 20. The recess 25 is adapted to seat the flange 16 of the expansible and compressible ring 15 which is placed in position in the union member 20 before the tail part 21 is screwed in place thereon. Thus with this arrangement the ring 15 is slidably inserted into or removed from the recess 11 when the female member 19 is screwed or unscrewed, respectively, on the outer wall 12 of the recess 11 by means of the inner end 26 of the tail part 21 and the annular shoulder 27, respectively, which abut against and force the flange 16 of the ring 15 in the direction that the female member is moving. The outer end 28 of the wall 12 is beveled to guide the ring 15 into the recess 11 when the female member 19 is screwed on the wall 12 and the outer edge 29 of the ring 13 is beveled away from the wall 12 to guide the ring 15 into encircling position on the ring 13 as it is slidably inserted into the recess 11. The inner edge 30 of the ring 15 is also beveled, being preferably double beveled, to enable the ring to be readily inserted into wedging position between the ring 13 and the outer wall 12 of the recess 11 as it is moved inwardly under the influence of the end 26 of the tail part 21. The ring 15 is sufficiently wide so that when it is inserted in position in the recess 11 with its inner end abutting against or lying closely adjacent to the end wall of the recess, as shown in Fig. 1, the flange 16 is positioned beyond the outer end of the wall 12 of the recess 11 to provide sufficient space therebetween for the annular shoulder 27 formed on the inner periphery of the female member 19. The latter is provided with an octangularly shaped shoulder 31 as is clearly shown in Fig. 2, so that it may be screwed or unscrewed on the male member 3 by means of a wrench.

In coupling the flexible hose 1 to the pipe 3, the male member 3 is first screwed onto the end of the pipe 2 and secured tightly in place thereon by the application of a wrench to the nut-shaped shoulder 7 thereof. The parts of the female member 19 are then assembled by inserting the ring 15 into the outer end of the union member 20 so that the free end of the ring extends out toward the inner end of the female member 19, the flange 16 thereof abutting against the outer face of the annular shoulder 27. The shoulder 27 preferably has an inside diameter only slightly greater than the external diameter of the ring 15 so that the latter is supported in the female member 19 substantially parallel with the threaded portion 34 of the inner end of said member thereby holding the end 30 of the ring 15 in proper position for insertion between the ring 13 and the wall 12 of the recess 11. After the tail part 21 is screwed tightly in position on the outer end of the union member 20, the female member 19 is slipped over the end of the hose that is to be connected to the pipe 3 and the ring 13 then placed in position on the end portion of the hose, as shown in Fig. 3. The thickness of the wall of the hose and the kind of material of which it is made will govern the size and thickness of the ring 13 that is to be used so that when the coupling is assembled and connecting such hose to the pipe the proper amount of compression will be exerted on the end portion of the hose to securely hold it in the coupling. The end portion of the hose together with the ring 13 is then forced over the shank 9 of the male member 3 of the coupling and into the annular recess 11 until the end of the hose abuts against the end wall of such recess. The female member 19 is then screwed on the outer periphery of the wall 12 by means of a wrench. As the female member is screwed into position on said wall, the ring 15 is carried forward by said member and guided by the beveled end 28 of the wall 12 into the recess 11. The beveled edge 30 of the ring 15 then enters the V-shaped space formed between the beveled edge 29 of the ring 13 and the inner periphery of outer wall 12 of the recess and under the force exerted by the end 26 of the tail part 21 on the outer face of the flange 16, forces its way between such members, compressing the ring 13 tightly around the outer periphery of the hose and firmly anchoring it therein. The inner periphery of the hose under the compression force of the ring 13 is wedged tightly against the outer periphery of the shank 9 and a portion of the material of which the hose is constituted is pressed into and firmly anchored in the serrated portion 17 of the outer peripheral surface of the shank 9. The hose is thus tightly gripped in place in the male member 3 between the contractible ring 13 which exerts an even compressive pressure on the outer periphery thereof through the wedging ring 15 and the outer peripheral surface of the shank 9 in the indented portion of which a portion of the hose material is firmly anchored and the hose will remain in position in the recess 11 while in use regardless of the force with which the fluid is forced through the hose and the amount of binding the hose will be subjected to. Due to the fact that the shank 9 extends beyond the compression ring 13 the hose is prevented from bending at the point where the compression ring ends thereby greatly minimizing the amount of strain on the end por-tion of the hose while in use. The shank 9 is beveled at 32 to prevent the end thereof from rupturing the wall of the hose during bending of the same. The inner periphery of the tail part 21 is also tapered outwardly at 33 to give the hose a greater bending radius without tension or strain. These features of construction enable the hose to bend easily without tension or strain on the walls of the hose thus preventing rupture of such walls while in use and increasing the life of the hose.

To uncouple the hose 1 from the pipe 2, the female member 19 is unscrewed from the outer wall 12 of the recess 11 by means of a wrench, the inwardly extending shoulder 27 thereof moving outwardly into contact with the inner face of the flange 16 on the ring 15 and as the female member is unscrewed, forces the flange outwardly, thereby slidably removing the ring 15 from the recess 11. When the ring 15 has been withdrawn from the recess, the ring 13 is enabled to expand and release its pressure on the outer surface of the wall of the hose and the hose may then be withdrawn from the recess by pulling outwardly on it or using a twisting motion if the shank 9 is provided with a spiral groove such as shown in Fig. 10. While I have shown and described one particular construction and mode of utilizing the invention for the purpose of enabling a clear understanding to be obtained of the same, I do not wish to limit myself to such; hence various changes in the form, construction and arrangement of the several parts may be resorted to without departing from the spirit and scope of the invention in order to render the invention susceptible of various uses as will be apparent to those familiar with coupling devices.

What is claimed is:

1. A coupling comprising a body section having an annular recess formed therein adapted to receive the end portion of a pipe, a contractible ring positioned in said recess and adapted to encircle the end portion of the pipe, and means coacting with said ring to tightly secure the end portion of the pipe in said recess, said means comprising a coupling member internally threaded at one end to screw on the outer wall of said recess, and a contractible member carried within said coupling member in spaced relation with the interior wall of the latter, said contractible member being adapted to be positioned in said recess intermediate the outer wall thereof and said contractible ring when said coupling member is screwed in position on the outer wall of said recess and to uniformly contract said ring closely about the end portion of the pipe so that that portion of the pipe wall encircled by said contractible ring is uniformly and tightly pressed against the inner wall of said recess, said contractible member being rotatably supported in said coupling member whereby said contractible member is enabled to be slidably inserted into or removed from position in said recess when the coupling member is screwed or unscrewed respectively on the outer wall of said recess.

2. A coupling comprising a body section having an annular recess formed therein adapted to receive the end portion of a pipe, a contractible ring positioned in said recess and adapted to encircle the end portion of the pipe, and means coacting with said ring to tightly secure the end portion of the pipe in said recess, said means comprising a coupling member internally threaded at one end to screw on the outer wall of said recess and provided with an interior annular groove adjacent its other end, and a contractible member supported within said coupling member and comprising a contractible sleeve portion spaced from the interior wall of said coupling member and adapted to be positioned in said recess intermediate the outer wall thereof and said contractible ring when said coupling member is screwed in position on the outer wall of said recess and to uniformly contract said ring closely about the end portion of the pipe so that that portion of the pipe wall encircled by said contractible ring is uniformly and tightly pressed against the inner wall of said recess, and an annular split flange formed on one end of said sleeve portion and adapted to loosely seat in the annular groove of said coupling member whereby said contractible sleeve portion is enabled to be slidably inserted into or removed from position in said recess when the coupling member is screwed or unscrewed, respectively, on the outer wall of said recess.

3. A coupling comprising a body section having an inner tubular shank adapted to enter the end portion of a pipe and provided with an outer annular portion concentrically disposed with relation to said tubular shank, said tubular shank and said annular portion constituting the inner and outer walls, respectively, of an annular recess formed therebetween and adapted to receive the end portion of the pipe, a cylindrical contractible ring positioned in said recess and adapted to encircle the end portion of the pipe, a cylindrical contractible clamping member positioned in said recess intermediate the outer wall thereof and said contractible ring and surrounding the latter, said contractible member being adapted to uniformly contract said ring closely about the end portion of the pipe so that that portion of the pipe wall encircled by said contractible ring is uniformly and tightly pressed against the outer peripheral surface of the tubular shank, an annular split flange formed on the outer end portion of said contractible member, and a coupling member rotatably connected with the split flange on said contractible member for slidably inserting said member into or removing it from position in said recess.

4. A coupling such as set forth in claim 3 in which the coupling member is adapted to threadedly engage with the outer wall of said recess and includes an interior annular groove within which the split flange on said cylindrical contractible member is adapted to loosely seat so that as said coupling member is screwed or unscrewed on the outer wall of said recess said contractible member is caused to be moved longitudinally into or out of said recess.

5. A coupling such as set forth in claim 3 in which the coupling member comprises a hollow cylindrical portion internally threaded at each end and provided with an inwardly extending shoulder formed on its inner peripheral surface intermediate the threaded ends thereof, one end of said cylindrical portion being adapted to threadedly engage with the outer wall of said recess, and an annular end portion threadedly engaging with the other end of said cylindrical portion, the inner edge of said annular end portion being spaced away from said inwardly extending shoulder so as to form an annular groove therebetween within which the split flange on said cylindrical contractible member is adapted to loosely seat so that as said coupling member is screwed or unscrewed on the outer wall of said recess, said contractible member is caused to be moved longitudinally into or out of said recess.

ERNEST SCHULTHESS.